United States Patent [19]
Kozuh

[11] 3,894,749
[45] July 15, 1975

[54] RAMP EXTENSION FOR TRUCK FRAMES

[75] Inventor: Frank J. Kozuh, Parma, Ohio

[73] Assignee: Midland-Ross Corporation, Cleveland, Ohio

[22] Filed: June 10, 1974

[21] Appl. No.: 477,909

[52] U.S. Cl. .......................... 280/106 R; 280/423 R
[51] Int. Cl. ............................................ B62d 21/00
[58] Field of Search ........ 280/106 R, 106 T, 423 R, 280/423 B, 425 R, 427, 434

[56] References Cited
UNITED STATES PATENTS
2,894,764  7/1959  Ronk ............................... 280/423 B
3,534,977  10/1970  Wessel ........................... 280/106 R Primary Examiner—Philip Goodman
Attorney, Agent, or Firm—Henry Kozak; Woodrow W. Portz

[57] ABSTRACT

Extensions for truck frames are provided for attachment to the rear end portions of side rails. The extensions have rearward sloping surfaces to avoid tractor and trailer collision type impacts in operation of backing a tractor under a trailer-mounted fifth wheel.

10 Claims, 7 Drawing Figures

PATENTED JUL 15 1975   3,894,749

RAMP EXTENSION FOR TRUCK FRAMES

BACKGROUND OF THE INVENTION

In preparing a highway truck tractor for use with cargo trailers, it is customary to modify the rear end of the chassis frame by cutting and restructuring especially the rear side rail termini in accordance with the location of the truck-mounted fifth wheel assembly. As a part of the preparation, the side rails are frequently cut at an angle sloping rearwardly to provide sloping rear edges to which a flat ramp-like piece is fitted and welded to each side rail edge thus provided. The resulting pair of ramps function as guides to trailer portions when attempting to couple a tractor to a trailer whose fifth wheel is positioned below the vertical gathering range of the truck-mounted fifth wheel. Such ramp and truck frame structure avoids the occurrence of damaging head-on collision of truck and trailer parts which could otherwise occur. Rearward extending ramp-like appendages of the truck-mounted fifth wheel assembly are also present in the prior art but have not gained commercial acceptance.

An important object of the invention is to eliminate the general practice of making integral improvements on the rear end of the chassis frame of a truck intended for use with a cargo trailer.

Other objects are to provide simple bolt-on devices which are readily replaceable, provide better appearance, fit any tractor frame, can be prepainted and installed quickly.

SUMMARY OF THE INVENTION

The invention resides in detachable frame-rail ramp extensions which are provided in pairs for mounting on rear end portions of the two side rails of a truck frame. Each ramp extension is normally formed of a simple one-piece steel stamping comprising a quadrilateral wall which, in reference to its operative position, has a front vertical edge, top and bottom generally parallel edges of which the bottom edge is substantially longer than the top edge, and a rear edge sloping rearwardly from the rear end of the top edge to the rear end of the bottom edge. The extension further comprises a flange joining continuously with the top and rear edges to form the ramp portion of the extension.

One form of the extension has a lower flange contiguous with the lower edge of the wall which may optionally join with the lower rear end of the first named flange. The front end portion of the extension conforms to lateral surfaces of the rear end portion of the associated truck frame side rail and is fastened thereto by bolts, rivets or welding. In one preferred embodiment, wherein the extension fits the inner surfaces of the side rail, the sloping flange surface may terminate upwardly in a slight hump having a height approximately the thickness of the top web of the side rail to eliminate obstruction by the side rail end. In another embodiment additional strength is obtained through a reinforcing bulge in the lower portion of the wall, or a lower flange.

DESCRIPTION OF THE PREFERRED EMBODIMENT

Figure 1:
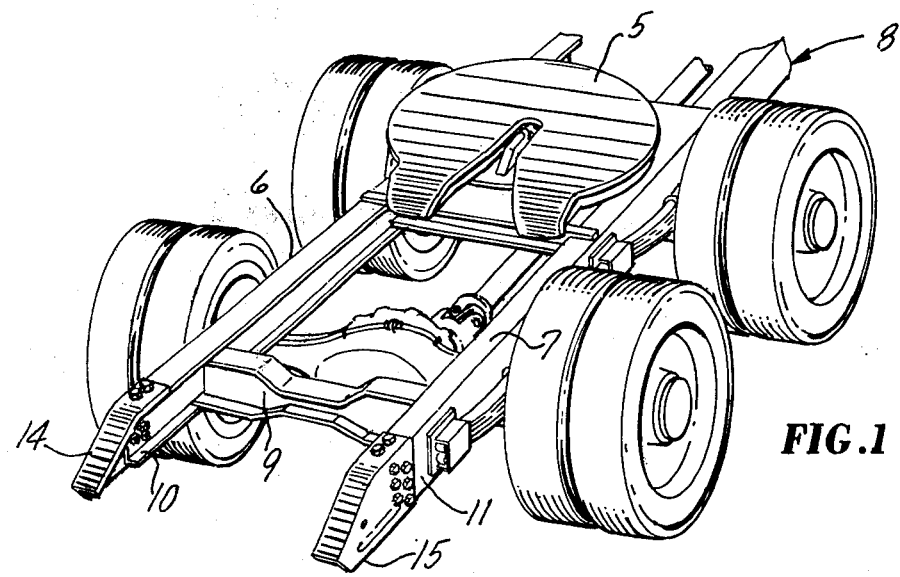
FIG. 1 is a fragmentary perspective view of a truck chassis illustrating a fifth wheel in place and a pair of ramp extensions mounted on the rear ends of the truck frame side rails.
Figure 6:
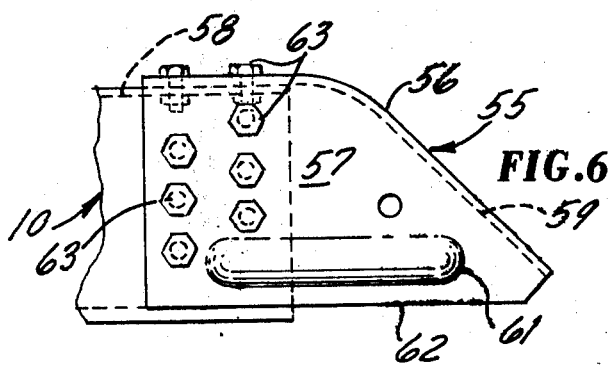
FIGS. 6 and 7 are fragmentary side and end views, respectively, of a rear portion of a side rail and a modified form of ramp extension characterized by a bulged stiffening portion of the vertical wall of the extension.
Figure 7:
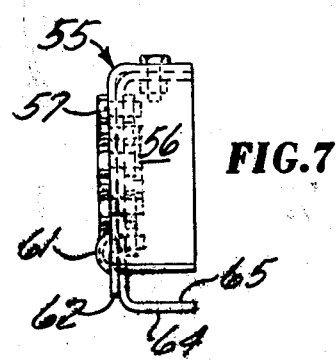

FIG. 1 is a perspective view of the rear portion of a truck chassis equipped with a fifth wheel 5 enabling the truck to function as a tractor for cargo trailers. Side rails 6,7 of the chassis frame 8 terminate rearwardly in the usual way beyond a transverse frame member 9 as rear end or stub portions 10,11. Ramp extensions 14,15 of which extension 14 is depicted in FIGS. 6 and 7 are shown attached to rear end portions 10,11 of the side rails 6,7.

Figure 2:
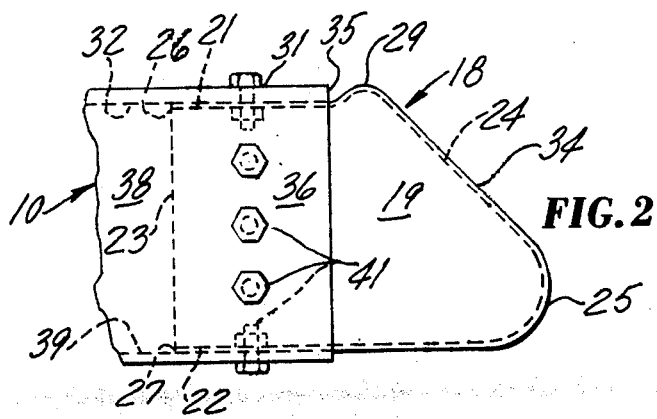
FIGS. 2 and 3 are fragmentary side and rear end views, respectively, of a rear end portion of a side rail and one form of detachable ramp extension characterized by a flange continuous along three sides of a vertical wall.
Figure 3:
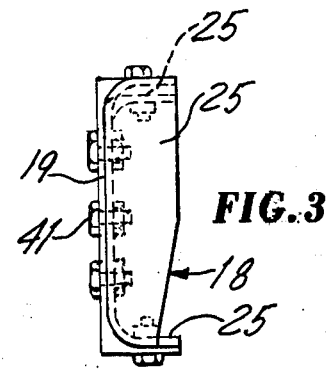

For purposes of description, in the three embodiments of ramp extensions described and illustrated herein, the extension comprises a wall which is normally vertical in its operative position joined with transversely extending flanges which are continuous at least with the top and rear edges of the wall. The top and bottom edges are generally or substantially parallel but the bottom edge is longer than the top edge. The wall and any flange are in right-angle usually filleted relationship to fit the side rail. In FIGS. 2 and 3, for example, a ramp extension 18 comprises a vertical wall 19 having a top edge 21, a bottom edge 22, a front vertical edge 23, and a rear edge 24 sloping rearwardly to a major extent from the rear end of the edge 21 to the rear end of the edge 22. Joined to the wall 19 is a flange 25 which extends continuously along wall edges 21,24,23 from point 26 to point 27.

The wall 19 and the flange 25 are shaped to define a hump 29 which rises to the level or plane of the upper surface 31 of the top web 32 of the side rail 10. The purpose of the hump 29 is to prevent any engagement of trailer parts riding up the sloping portion 34 of the extension from engaging the end surface 35 of the web 32.

Obvious from FIG. 2 is that a forward portion of the extension 18 corresponding in length generally to that of the top edge 21 of the wall 19 extends in longitudinally overlapping relation with a rear end portion 36 of the side rail. As shown in FIGS. 2 and 3, the outer surface of the portion of extension 19 overlapping with the side rail conforms to the inner surface of the side rail and is secured along the top web 32, the vertical web 38, and the bottom web 39 of the side rail by bolts 41. Extension 18 is preferably manufactured by cold forming a one piece stamping blank of predetermined shape.

Figure 4:
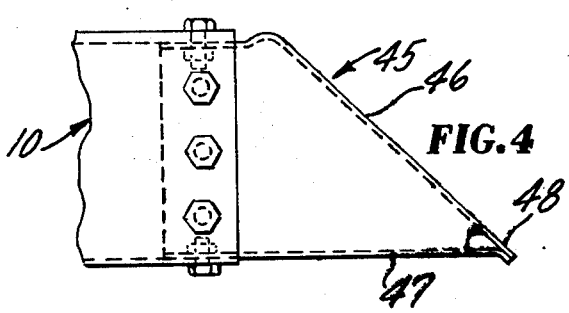
FIGS. 4 and 5 are fragmentary side and end views, respectively, of the rear end portion of a side rail and another type of ramp extension attached thereto characterized by two flanges along three sides of the vertical wall and joined at the rear ends.
Figure 5:
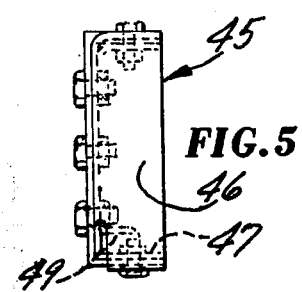

FIGS. 4 and 5 relate to a ramp extension 45 which differs primarily from extension 18 by the substitution of flanges 46,47 for the continuous flange 25 of FIGS. 2 and 3. The shape of the rearward ends of the flanges 46,47 adjacent their juncture at 48 is dependent upon utilization of the original flat metal blank from which extension 45 is shaped. To attain a juncture at 48 at which point the joined ends of the flanges may be welded for greater strength, flange 47 has a notch 49 which enables the original blank to be cut to produce some overlapping of the flanges at point 48 after shaping of the blank. The form of the ramp extension as depicted in FIGS. 4 and 5 has the advantage of providing nearly maximum ramp length along the sloped portion of flange 46 from a one piece stamping. Extension 46 is secured, e.g. by bolts, to the side rail 10 in a manner similar to that described heretofore for extension 18.

FIGS. 6 and 7 illustrate a ramp extension 55 readily formed from a one piece flat metal blank with the forward portion of the extension 55 shaped along its interior surfaces to fit over at least outer top web and vertical web surfaces of the side rail 10. As shown, the extension 55 is formed with a single upper flange 56 joining with the vertical wall 57 along its upper and rearward sloping edges 58,59, respectively. The wall 57 has an elongate bulged area 61 extending lengthwise of its lower portion functioning as a stiffener or reinforcement against lateral or vertical loading applied at any point along the ramp surface flange 56. In the form shown, the extension 55 does not have a flange along its lower edge 62. Hence, the extension 55 is provided with a forward portion of sufficient length corresponding to a somewhat longer upper edge portion of the wall 57 to accommodate two vertical rows of bolts 63. Optionally, the extension 55 may be constructed with a lower flange covering the undersurface 64 of the lower side rail web 65.

The various embodiments of the ramp extension described herein have been illustrated as shapes easily cold-formed from flat metal blanks. While the left side extension has been illustrated for each embodiment, the extensions are normally produced in mirror image pairs consisting of "rights" and "lefts". Ramp extensions according to the designs herein disclosed are readily provided as forgings or castings when circumstances favor such methods of manufacturing.

What is claimed is:

1. A detachable ramp extension for the side rail of a truck frame comprising:
   a generally quadrilateral wall having, in operative position, a front vertical edge, top and bottom generally parallel edges of which the bottom edge is substantially longer than the top edge, and a rear edge sloping rearwardly from the rear end of the top edge to the rear end of the bottom edge;
   a flange joining continuously with said top and rear edges, and extending in its transverse direction perpendicularly to the general plane of the wall;
   a front end portion of said extension formed by said wall and flange having a length substantially that of said top edge, and being of a right-angle configuration adapting said end portion to conform in longitudinal overlapping relation with top and side webs of the rear end portion of a truck frame side rail.

2. A frame rail extension as defined in claim 1 comprising:
   stiffening means integral with the lower portion of said wall for resisting vertical or lateral loading of said extension.

3. A frame rail extension as defined in claim 1 comprising:
   means on said front end portion for connecting with the rear end portion of a side rail.

4. The combination comprising a truck frame having a pair of longitudinal side rails each comprising side, top, and bottom webs; and
   a pair of detachable ramp extensions for said side rails attached, at installed position, to the side rails with each rear end portion of a side rail in longitudinally overlapping relation with the front end portion of the corresponding attached extension; each of said extensions comprising:
   a generally quadrilateral wall having, in operating position, a front vertical edge, top and bottom generally parallel edges of which the bottom edge is substantially longer than the top edge, and a rear edge sloping, to a major extent, rearwardly from the rear end of the top edge to the rear end of the bottom edge;
   a flange joining continuously with said top and rear edges and extending in its transverse direction perpendicularly to the general plane of the wall;
   a front end portion of said extension formed by said wall and flange having a length substantially that of said top edge, and being of a right-angle configuration fitting in generally conforming relationship with at least top and side webs of a rear end portion of the respective associated side rail; and
   means for securing said extension portions and said side rail portions together.

5. The combination of claim 4 wherein:
   said extensions comprise lower flanges contiguous and substantially coextensive with said bottom edges of respective extensions with forward portions of said lower flanges in conforming relation with adjacent respective lower side rail webs.

6. The combination of claim 5 wherein:
   said extension front end portions conform to the inner web surfaces of side rail portions.

7. The combination of claim 4 wherein:
   said front extension portions conform to the inner surfaces of side and top webs of respective rear side rail portions; and
   said flange and said wall are shaped to define a hump in said flange immediately rearward of the rear end of said top web.

8. The combination of claim 4 comprising:
   stiffening means in each extension integral with the lower portion for resisting vertical and lateral loading of the respective extension.

9. The combination of claim 8 wherein:
   said stiffening means comprises a horizontally elongate bulged area of said wall.

10. The combination of claim 8 wherein:
    said stiffening means comprises a lower flange substantially coextensive with said bottom edge and perpendicular to said wall.

* * * * *